United States Patent
Ponnuswamy et al.

(10) Patent No.: US 11,720,270 B2
(45) Date of Patent: Aug. 8, 2023

(54) CLIENT-SIDE COMPRESSION

(71) Applicant: EMC IP Holding Company LLC, Hopkinton, MA (US)

(72) Inventors: Senthil Ponnuswamy, San Jose, CA (US); Charles W. Kaufman, Redmond, WA (US); Radia J. Perlman, Redmond, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 420 days.

(21) Appl. No.: 17/110,024

(22) Filed: Dec. 2, 2020

(65) Prior Publication Data
US 2022/0171555 A1    Jun. 2, 2022

(51) Int. Cl.
| | |
|---|---|
| *G06F 3/06* | (2006.01) |
| *H04L 67/1097* | (2022.01) |
| *H03M 7/30* | (2006.01) |
| *G06F 21/60* | (2013.01) |
| *H04L 9/08* | (2006.01) |
| *H04L 9/06* | (2006.01) |

(52) U.S. Cl.
CPC ............ *G06F 3/0641* (2013.01); *G06F 3/067* (2013.01); *G06F 3/0608* (2013.01); *G06F 3/0659* (2013.01); *G06F 21/602* (2013.01); *H03M 7/6064* (2013.01); *H04L 9/0891* (2013.01); *H04L 67/1097* (2013.01); *H04L 9/0618* (2013.01)

(58) Field of Classification Search
CPC .... G06F 3/0641; G06F 3/0608; G06F 3/0659; G06F 3/067; G06F 21/602; H03M 7/6064; H04L 9/0891; H04L 9/0618; H04L 67/1097
See application file for complete search history.

(56) References Cited

U.S. PATENT DOCUMENTS

| | | | |
|---|---|---|---|
| 10,158,483 B1 * | 12/2018 | Newman | H04L 9/3242 |
| 2016/0062918 A1 * | 3/2016 | Androulaki | H04L 9/0861 |
| | | | 713/193 |
| 2018/0364917 A1 * | 12/2018 | Ki | G06F 12/1018 |
| 2021/0377016 A1 * | 12/2021 | Perlman | H04L 9/0891 |

FOREIGN PATENT DOCUMENTS

WO    WO-2022089755 A1 *    5/2022

* cited by examiner

*Primary Examiner* — Hee K Song
(74) *Attorney, Agent, or Firm* — Womble Bond Dickinson (US) LLP

(57) ABSTRACT

A method of sending blocks of data from a client to be stored at a storage server, wherein for each block compression and encryption is performed at the client, and deduplication is performed at the server. Security is thus enhanced as the block is compressed and encrypted when it is sent over an unsecured network and when it is stored in potentially a third-party backup system. Provisions are made to enable addition of new compression algorithms and for retirement of old compression algorithms, while ensuring that a client would not receive a block which was compressed using an unsupported, e.g., retired, compression algorithm. In some examples a compression algorithm ID is tied to an encryption key version to enable refresh of blocks compressed with old algorithm.

20 Claims, 5 Drawing Sheets

CLIENT-SIDE COMPRESSION

TECHNOLOGICAL FIELD

The present disclosure relates generally to handling of data to be backed-up from a client to a back-up system, and in particular, to backups employing compression, encryption and deduplication.

BACKGROUND

Storage systems are becoming larger and more distributed, and non-secure network transfers and cloud storage are increasingly being used by enterprises and other organizations for data transfer and primary data storage as well as for backup data storage. In conventional storage systems the data may be deduplicated (dedup) and compressed to reduce storage space requirements, and may also be encrypted for security.

The client data to be stored may comprise sensitive, confidential information, and the clients' systems are frequently required to transfer their data over untrusted, non-secure or public networks. Such non-secure storage systems and network transfers expose plaintext data to possible unwanted disclosure and exploitation. Entities may not wish to expose their data to an unsecure network or third-party storage system. Therefore, they may need to protect the data at its source by encrypting it prior to transfer and storage.

If the data is to be encrypted, compression has to occur before encryption, because encrypted data will not compress. Since clients might not trust the server to see their plaintext, it is desirable for encryption to be done at the client. However, if the data is sent to the server encrypted, compression cannot be performed at the server.

The subject inventors have previously disclosed processes for encryption at the server in an SGX enclave (Software Guard Extensions), so it is as secure as encrypt-at-the-client, but compression acceleration hardware is not accessible to an SGX-enclave. Consequently, significant performance degradation would occur if compression was done in the enclave.

It is also desirable for a server to support multiple clients in the same dedup domain. The multiple clients may store different types of data, but there are multiple compression algorithms available, some of which may be better suited to certain types of data than others. Generally the client is in a better position to know which application wrote the data, and therefore, to choose a proper compression algorithm.

The inventors surmised that there are cases where compression is best done at the client. First, since it may be preferred to perform encryption at the client for trust reasons, and since compression is performed prior to encryption, under such conditions compression should be done at the client. Second, for optimal use of compression algorithm, it is preferred to perform compression at the client. Since the client has knowledge of the application that created the data, the client is in a better position to select the proper compression algorithm. The server, on the other hand, only sees a block of data at a time, and hence does not know which application created the data. Once compression is done, encryption can either be done at the client or at an enclave at the server.

Incidentally, in this disclosure reference to "block" includes data set of fixed or variable length which is a subset of the total sum of data to be backed up, e.g., a subset of a file, and includes data set sometimes referred to as a "chunk." Also, in standard deduplication a fingerprint is generated for each block/chunk. The fingerprint is generally calculated by software, typically using cryptographic hash functions. Thus, in this disclosure the terms hash and fingerprint may be used interchangeably to mean the unique identification used to compare contents of different block so as to perform deduplication.

At a certain point during normal operation it may become desirable to introduce new compression algorithms and/or retire an old compression algorithm. Either process has to be carefully coordinated across clients, because with dedup one client might read a block whose ciphertext was written by a different client (because the plaintext had the same hash). In cases where the first client implemented a different set of compression algorithms than the second client, it would not be able to read the data if it was written using a compression algorithm that the first client has not implemented.

In today's systems, it is typically the server that does the compression after receiving plaintext blocks from the client. Because the same system (the storage server) does the compression and the decompression, and typically old compression algorithms do not get retired, there is no problem with coordination of compression algorithms. If an implementation supports multiple compression algorithms, compressed plaintext data is typically encoded with an identifier of which compression algorithm was used for compression. For example, the first byte might specify the compression algorithm.

The subject inventors surmised that a solution should be provided for the situation where there may be multiple clients in the same dedup domain, and compression/decompression is done at the clients. A solution needs to also address the case of a single client, if it uses multiple compression algorithms, and needs to introduce new algorithms and retire others, especially in cases where under dedup another client may have pointers to common blocks.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

The invention is particularly well adapted to be used with cloud-based deduplication, storage and backup systems, and will be described in that context. As will be appreciated, however, this is illustrative of only one utility of the invention, and that the invention has applicability to other types of systems and uses.

Figure 1:
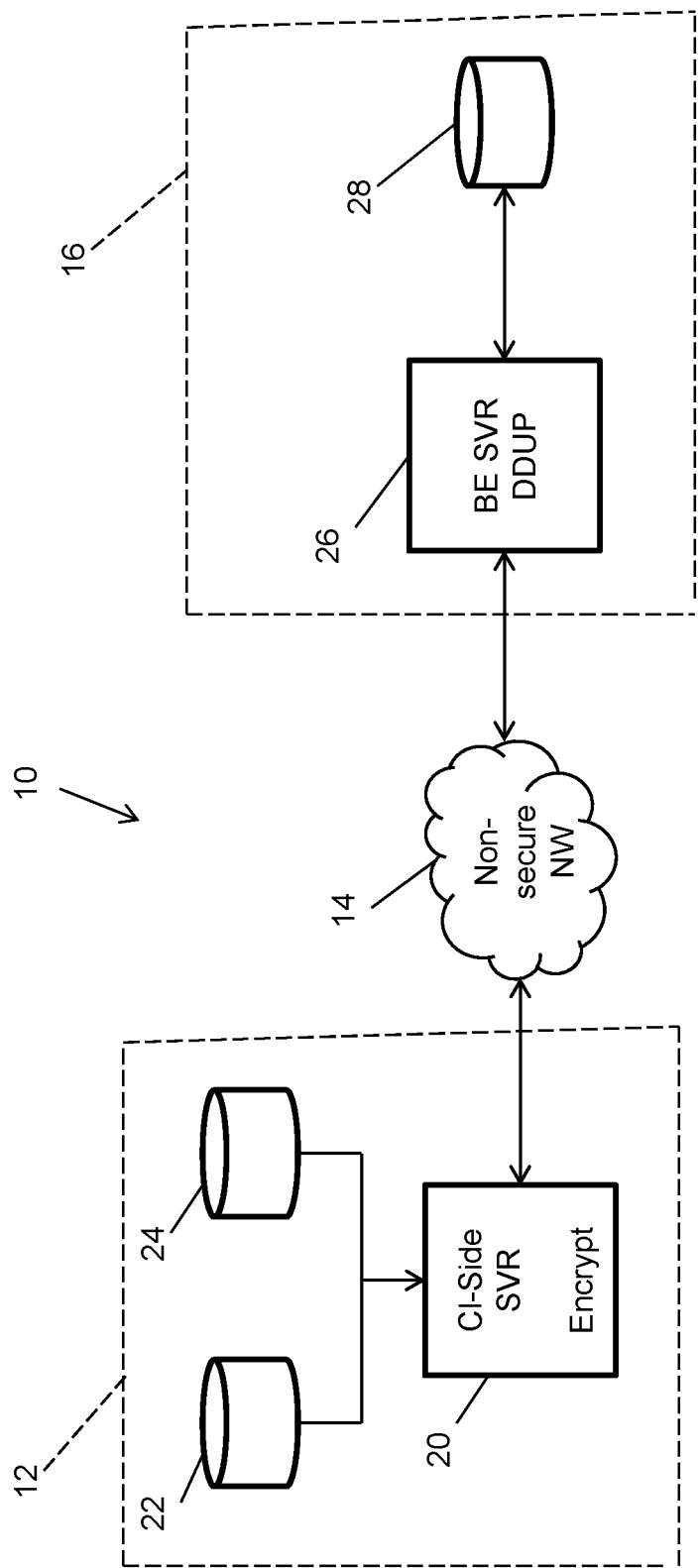
FIG. 1 is a functional block diagram illustrating an architecture of a system of the type in which the invention may be employed.

FIG. 1 is a functional block diagram that illustrates the architecture of a system 10 of the type with which the invention may be employed. System 10 may be a distributed processing and storage system of an enterprise that performs remote deduplication and storage of encrypted source data conveyed from a client-side subsystem 12 over a non-secure network 14 to a backend subsystem 16. The client-side subsystem 12 may comprise a client-side server 20 (also referred to herein as a "client") that processes source data in primary storage which may comprise hard disks 22, 24, for example, and stores the processed data in storage 28 of the backend backup system 16. Client 20 may compress and encrypt the source data, as will be described, and transfer the compressed and encrypted data over the non-secure network 14 which may be a public or private data communications network that interconnects the client-side subsystem 12 with the backend subsystem 16 for transfer of data. The backend subsystem 16 may comprise a backend server 26 that deduplicates the received data from the client 20, as will be described, and stores the deduplicated data in backend storage 28.

Although FIG. 1 shows a single client-side server 20 and a single backend server 26, it will be appreciated that system 10 may comprise a plurality of client-side servers 20 and a plurality of backend servers 26. Each server of the two pluralities of servers may perform similar functions. The servers may comprise one or more processors and associated memory for storing executable instructions for controlling the operations of the one or more processors of each server to perform the functions described herein. As indicated in FIG. 1, and as will be described in more detail below, client 20 may compress and encrypt primary source data and transfer the compressed and encrypted data over the network 14 to the backend server 26. The client 20 may also decrypt and decompress data returned via the network 14 from the backend server.

As will also be described, the backend server 26 may deduplicate the compressed and encrypted data block in the write data received via the network from the client-side server without first decrypting or decompressing it by deduplicating the hash of the plaintext data and its corresponding metadata in the write data block against previously stored hashes. If the received hash of the plaintext of the encrypted block in the write data is new, the server may store the ciphertext and metadata in the write block in backend storage 28. If, however, the hash and metadata already exist in storage, indicating that the data is duplicate data that has already been stored, the backend server does not store the data and metadata in the write block. Backend server 26 may comprise a DataDomain deduplication appliance of the Dell EMC.

In disclosed embodiments the backend system may deduplicate and store ciphertext that was encrypted by a client-side server without having access to either the plaintext or the encryption keys and without first decrypting the ciphertext. Furthermore, the backend system may deduplicate encrypted data blocks when the plaintext of two blocks is the same, even though the backend server and storage system see only encrypted data blocks. Moreover, an encrypted block of plaintext may be deduplicated even if the client/server has done a key rollover between the time the client/server first encrypted the block and the time when the backend server stored the block to backend storage.

In disclosed embodiments the client server may choose an arbitrary initialization vector (IV) for combining with the plaintext before creating the encrypted block of ciphertext—however the storage system may store only one version of an encrypted block that has been deduplicated. The initialization vector may be, for example, either a random or pseudorandom non-repeating primitive, such as a number used once (nonce) that is combined with the plaintext prior to encryption to randomize the plaintext.

Regarding compression, any solution for client side compression should also permit to perform as much deduplication as possible at the storage system, so as to conserve storage space. The solution needs to enable multiple clients in the same dedup domain implementing different compression algorithms. However, it is important to avoid a case wherein a client retrieves a block that was compressed with an algorithm that the client does not support. This may happen when another client may have written a block with the same plaintext hash, but using a compression algorithm not supported by the retrieving client. This may also occur if the fetching client has written the block a long time ago using a compression algorithm that it no longer supports. In this respect, the solution would also preferably permit introducing new compression algorithms and delete old compression algorithms. However, in order to have a client safely stop supporting a compression algorithm, the solution must ensure that the client would never read a block that was compressed with the deleted compression algorithm.

The present disclosure thus includes, without limitation, the following example implementations.

Figure 2A:
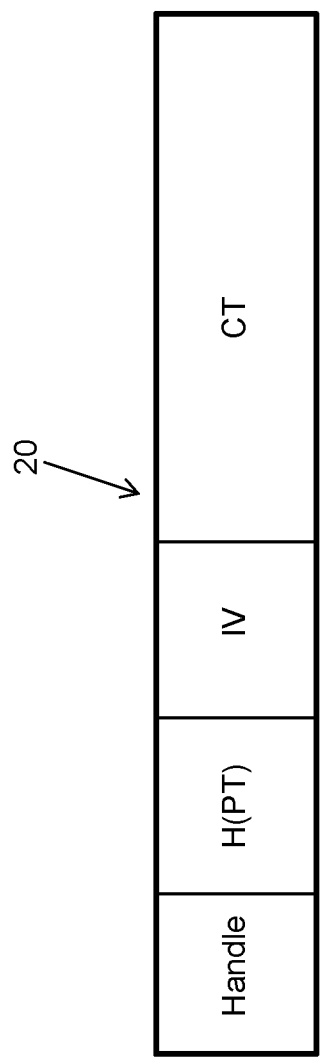
FIG. 2A illustrates one exemplary embodiment of a format for a block of write data comprising metadata and ciphertext (CT) for a block of encrypted plaintext, according to some example implementations.

Some example implementations provide methods of performing client-side compression and encryption of data blocks prior to transmission over a network to the storage system. The inventors have previously disclosed method for performing client-side encryption. See, e.g., US 2020/0213109, which is incorporated herein by reference in its entirety. In the previously disclosed examples, the client chops the data to be backed up into blocks (which may be fixed or variable length) and assigns each block a "handle" (e.g., the address at which the block starts in the client's virtual address space). To write a block, the client sends to the storage server the command: "write (handle, hash of plaintext, Initialization Vector (IV), ciphertext)". See, FIG. 2A illustrating one exemplary embodiment of a format for a block 20 of write data comprising hash of the plaintext H(PT) and ciphertext (CT) for a block of encrypted plaintext. The storage server can perform dedup using the hash of plaintext received in the write command without having to decrypt the ciphertext.

Figure 2B:
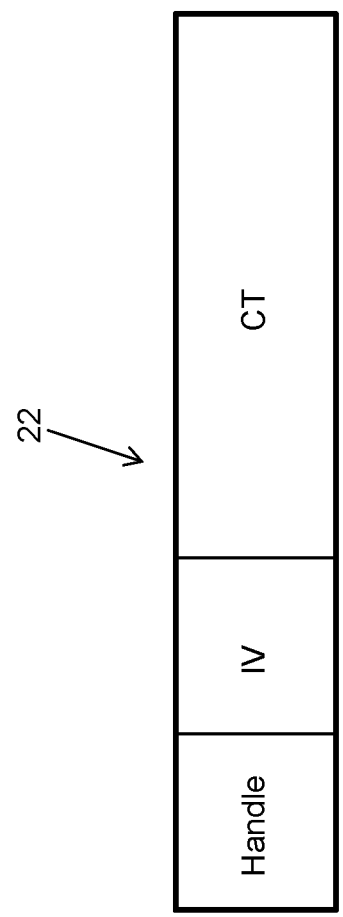
FIG. 2B illustrates an example of a format for a read block that may be returned by the backend server in response to a read request.

To read a block, the client sends the command "read (handle)" and receives (handle, IV, ciphertext). See, FIG. 2B illustrating an example of a format for a read block 22 that may be returned by the backend server in response to a read request. Consequently, the data block can only be deciphered on the client side, and the block is in an encrypted form whenever it is outside of the client, i.e., in transmission or storage. Meanwhile, the storage server keeps a data structure, referred to as ClientBlocksList, which contains for each block the pair (handle, hash of plaintext) where hash of plaintext is also referred to as fingerprint in other parts of this document.

The disclosed client-side encryption method includes the ability to rotate keys, while still enabling to dedup the same plaintext block. To do that, when writing a block, the client sends an additional field "key version", so for a write command it sends "write (handle, hash of plaintext, key version, IV, ciphertext". The storage server will overwrite a previous block with the same hash if the received write has a higher key version number. When the client asks to read handle, it receives (handle, key version, IV, ciphertext).

Note that with keys, there is a linear precedence (key n is older than key n+1, etc.). Conversely, with compression algorithms there is no way to know in advance which algorithms might be retired. Nevertheless, the methods provided herein disclose how to handle rotating (adding and/or retiring) compression algorithms. Incidentally, the disclosed examples will still assume that a client sends a compressed and encrypted block to the server, and the server, in addition to the dedup table, keeps, per server, a ClientBlocksList, which also lists, for each client (handle, hash). The dedup table is based on the plaintext hash provided by the client.

As noted, the storage server performs dedup using the hash provided by the client. The hash asserted by the client could be of the compressed block or the uncompressed block. The advantage of having the hash based on the compressed block is that the design is somewhat simpler, because the same plaintext compressed with two different algorithms will not have the same hash. The advantage of having the hash based on the uncompressed block is that the block can be deduped even if it is compressed with different algorithms. Note that in the disclosed embodiments the hash is always based on the uncompressed block.

Each client in the dedup domain supports a set of compression algorithms. Compression algorithms that are known to be implemented by all clients in the dedup domain may be marked at each client as "OK to use for compression". There might be some compression algorithms that are not marked as "OK to use for compression" even though all of the clients implement them. For example, they have been replaced by newer/better algorithms, but the prior implementation is still operational, in case there is old data that was compressed using the old version. Also, although all clients may support the algorithm, it has not yet been verified that they all support the algorithm. When an algorithm is undesirable because it has been replaced with a newer/better algorithm, the old algorithm might still be in the list of algorithms at all the clients, listed as supported, but not marked as "OK to use for compression".

When a client compresses a block, it chooses one of the algorithms that are marked as "OK to use for compression". When decompressing, the client must use the algorithm that is indicated in the compressed data, regardless of whether that algorithm is marked as "OK to use for compression" or not. Each client may then maintain a list of compression algorithm ID's that are supported by the client, and also listing ID's of algorithms that are approved for use to compress blocks.

Figures 3, 4:
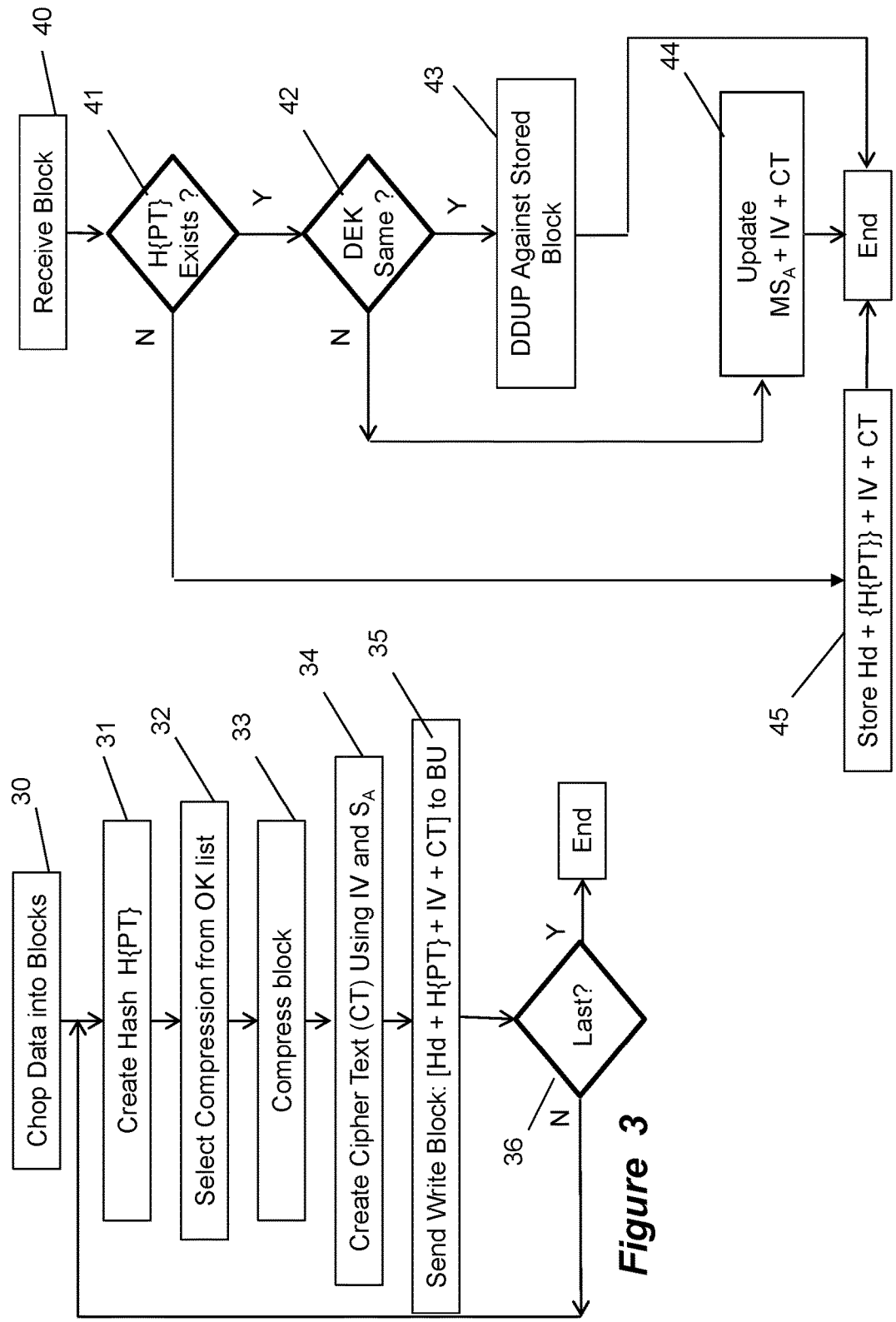
FIG. 3 illustrates a flow chart for a process to be executed by a client to send a data block for storage, according to an embodiment.
FIG. 4 is a flow chart illustrating a process to be executed by a storage server when receiving a data block for storage, according to an embodiment.

FIG. 3 illustrates a flow chart for a process to be executed by a client to send a data block for storage, according to an embodiment. At step 30 the client chops the data into blocks of variable or fixed size. In this example, at 31 the client creates a hash of the plain text, H{PT}. As noted, in other examples the client may calculate a hash of the compressed text H{CT}. At 32 the client having knowledge of the application that generated the data, selects the appropriate compression algorithm from the list of algorithms approved for use, and at 33 uses the algorithm to compress the block. At 34 the client creates the ciphertext {CT} using the IV. At 35 the client sends to the backup (BU) system a write command with indication of a handle Hd, the hash H{PT}, metadata, which includes the IV, and the ciphertext {CT}. At 36 the client checks whether there's more blocks to send for storage. If not, the process ends; otherwise the process reverts to step 31.

FIG. 4 illustrates a flow chart for a process that may be executed by the storage system, according to an embodiment. At step 40 the system receives the block from the client. At step 41 the system uses the hash received from the client to dedup the block. If no match is found, the server stores the received block. If a hash match is found, the server checks whether the data encryption key (DEK) is the same and when it is the same, the server dedups against the stored block. However, if the key is not the same, the previously stored block may be updated at 44 and replaced with a new block $MS_A$+IV+CT. wherein "$MS_A$" refers to metadata about a client's DEK, e.g., an encryption key version identifier.

To introduce a new compression algorithm, in one example the clients are, one by one, configured to understand how to compress and decompress with that algorithm. Each client adds the ID of the new algorithm to its list, but the algorithm is not marked as "OK to use for compression" until all clients have been configured with knowledge of that algorithm. Once all clients have been configured to know about the algorithm, they can be configured, one by one, to mark the new algorithm as "OK to use for compression".

According to other embodiments, instead of individually configuring all the clients, the server could be configured, and inform all the clients of the new configuration. According to yet another embodiment, each client informs the server of its set of compression algorithms, and perhaps desirability (such as algorithms that the client would prefer not to use for compression). Then the server could create a uniform set of configuration settings to be sent to all the clients.

Since according to the disclosed embodiments the server only sees encrypted blocks, it cannot know which compression algorithm has been used for each block. Consequently, a solution should be provided to the system to ensure that it is safe for a client to retire a compression algorithm, especially since due to dedup, there might be a block that was written with the old compression algorithm. According to disclosed embodiments the following may be implemented. When the client writes a block, in addition to (handle, key version, IV, ciphertext), it could specify "compression algorithm" ID indicator. Then the server can keep the ID indicator, along with the key version, in the dedup table or with the stored ciphertext. Storing the compression algorithm indicator with the ciphertext introduces an extra lookup when attempting to get rid of an old compression algorithm. According to an alternative embodiment, the server is not informed of the compression algorithm, but rather the client has to discover which compression algorithm was used after the client decrypts a block. This embodiment has the advantage of less metadata and less information to pass to the server when storing a block, thus also reducing bandwidth requirements.

As noted, the disclosed embodiments also enable retiring of a compression algorithm, but the client has to know when it is safe to retire a compression algorithm. The following embodiments ensure safe retirement of compression algorithms. In each of the disclosed embodiments, before retirement of a given compression algorithm can commence, it must be ensured that the algorithm is not marked in any of the clients' configurations as "OK to compress". This ensures that no newly stored blocks will be written with that algorithm.

In an embodiment where the hash is done on the uncompressed block, the server will not store a received block that was compressed with a new compression algorithm if the same block has already been stored—even if it was previously compressed using an old compression algorithm. Consequently, it may happen that when the client seeks to read the stored block, it will receive the block that was compressed with the old compression algorithm, since the new one was deduped. Therefore, merely scanning through the ClientBlocksList and ensuring that none of the client's currently stored blocks are using the old algorithm will not ensure that the client will never be sent a block compressed using the old algorithm. For this reason, the compression algorithm is not stored in the clientblockslist. It is stored in the dedupe table and can be found by looking up the hash found in the clientblocklist in the dedupe table.

According to one embodiment, the client would inform the storage server of the compression algorithm when storing the block (just like it informs the server of key version number). If the client wishes to retire a specific compression algorithm, the server makes sure that the algorithm is not marked as "OK to use" in the configuration at any client (or the system administrator must be trusted not to make a configuration mistake). The server could even reject blocks stored by any client, if it has been compressed with that algorithm, once a client has informed the server that it wishes to retire the algorithm. In other embodiments, once an algorithm is no longer marked as "OK to use for compression" the server could refuse a block that a client attempts to store, if the client asserts it used that algorithm to compress the block.

Figure 5:
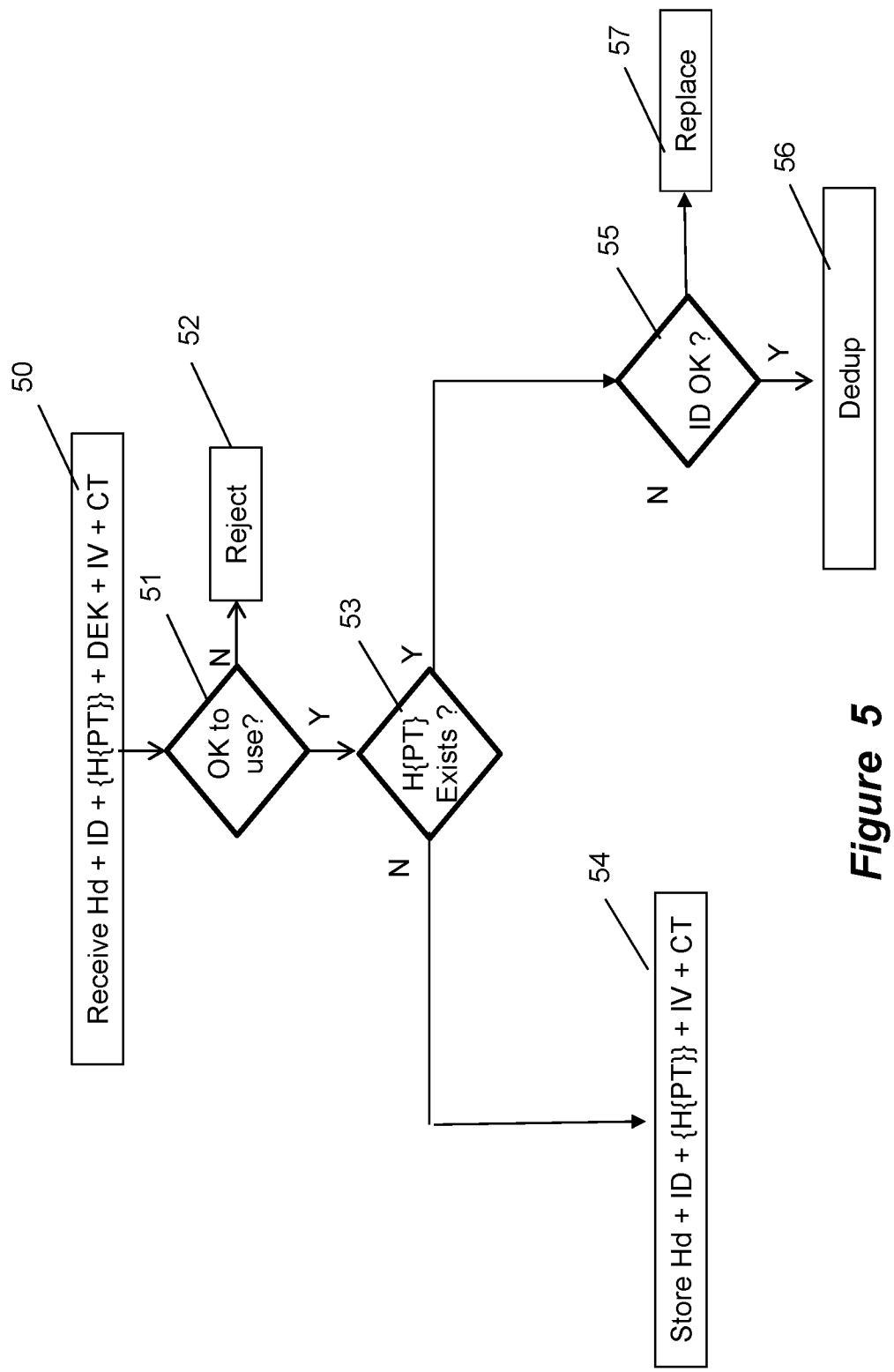
FIG. 5 illustrates a flow chart of a process for retiring a compression algorithm, according to an embodiment.

In some disclosed embodiments, the server will overwrite a block that was previously written with a retired compression algorithm. Also, the storage server would maintain indication for each compression algorithm of either OK to use for compression or flagged for retirement. Thus, as illustrated in FIG. 5, when a new block arrives for storage at 50, it includes (handle, hash, compression algorithm ID, key version (DEK), IV, ciphertext). At 51 the storage server checks whether compression was done using an algorithm marked OK to use. If not, at 52 the storage server refuses the block. Conversely, if the block was compressed with an algorithm marked OK to use, the storage server would check the hash at 53. If no match is found, at 54 the server stores the block. If at 53 a hash match is found, at 55 the server checks whether the already stored block was compressed using an algorithm ID which is ok for use, i.e., not marked for retirement. If so, the storage server dedups the new block. If the old block was compressed with an algorithm having an ID that is no longer valid, i.e., not marked OK to use or marked for retirement, at 57 the server would replace the older version with the new block.

In other examples, when a client informs the storage server that it would like to retire a compression algorithm Z, the server sweeps through the client's ClientBlockList to find any blocks that were compressed using compression algorithm Z. For each of those, the storage server sends to the client "please refresh this block" (handle, key version, IV, ciphertext). If the only indication of the compression algorithm used is the metadata (as opposed to being encoded in the compressed data), then the server will need to also send "compression algorithm ID" (so it will send (handle, compression algorithm ID, key version, IV, ciphertext). The client would then respond with (handle, compression algorithm ID (with which the refreshed block has been compressed), key version, IV, ciphertext).

According to a further embodiment, the compression algorithm ID received from the client is stored in the dedup table, not in the ClientBlockList. When the storage server receives a request to retire an algorithm, the storage server would scan the dedup table to find all hash entries having algorithm ID of the algorithm to be retired. At that point, the storage server has a list of blocks that need to be refreshed, but without knowledge of which client previously compressed each block. Then, for each block in the list, the storage server would go through the ClientBlockList to find a client having the same hash entry. The server would then ask that client to refresh or rekey the block. Since the server already removed the "OK to use indicia" from the old algorithm, the client will refresh the block using the new algorithm.

According to further embodiments the storage server is not informed which compression algorithm is used. In such cases, a solution needs to be provided to enable the client to know when it is safe to retire a particular compression algorithm. That is, the client must be assured that it will never read a block that was compressed with the retired algorithm. In the embodiment, the obsolescence of a compression algorithm is tied with a key version. For example, the configuration of each compression algorithms would include "guaranteed not to be used with key version n or newer/higher". To retire compression algorithm Z, assuming the most recent encryption key version is n, first all clients must be marked as not using Z for compression. Then compression algorithm Z is marked as "retire after key version n+1."

For a client to safely retire algorithm Z, the client must ensure that all of the blocks in its ClientBlocksList are encrypted with key version n+1 or higher. This is done by having the storage server sweep through the client's ClientBlocksList and asking the client to rekey any blocks with key version n or older. Once all of the client's stored blocks are stored with key version n+1 or higher, then the client can safely retire compression algorithm Z.

The disclosed embodiments support multiple compression algorithms, especially across clients, where the clients in the same dedup domain do the compression and then encrypt each block prior to sending to the storage system for storage. The embodiments also enable clients to introduce new algorithms and retire old algorithms. The storage server is able to coordinate compression algorithm configurations at the clients. In some embodiments, the client asserts the compression algorithm ID when sending the ciphertext. The server then keeps the compression algorithm ID along with the ciphertext, therefor not needing to encode the compression algorithm in the compressed data. In some embodiments the storage server replaces a duplicate block with a newly stored one if the old block was stored with an algorithm that is marked for retirement. Conversely, the server would refuse a newly received block if it is marked with a compression algorithm that is flagged for retirement. In other embodiments, obsolescence of a compression algorithm is coordinated with encryption key version number.

Note that in embodiments where key rotation is implemented, the client would rotate keys periodically. Therefore, when a client requests to retire a compression algorithm and the storage server identifies blocks that should be refreshed prior to retiring the algorithm, it is not necessary to immediately request the client to refresh these blocks. Instead, the refresh action can be postponed until a key refresh is executed, thus in essence the refresh process adds no additional overhead.

Figure 6:
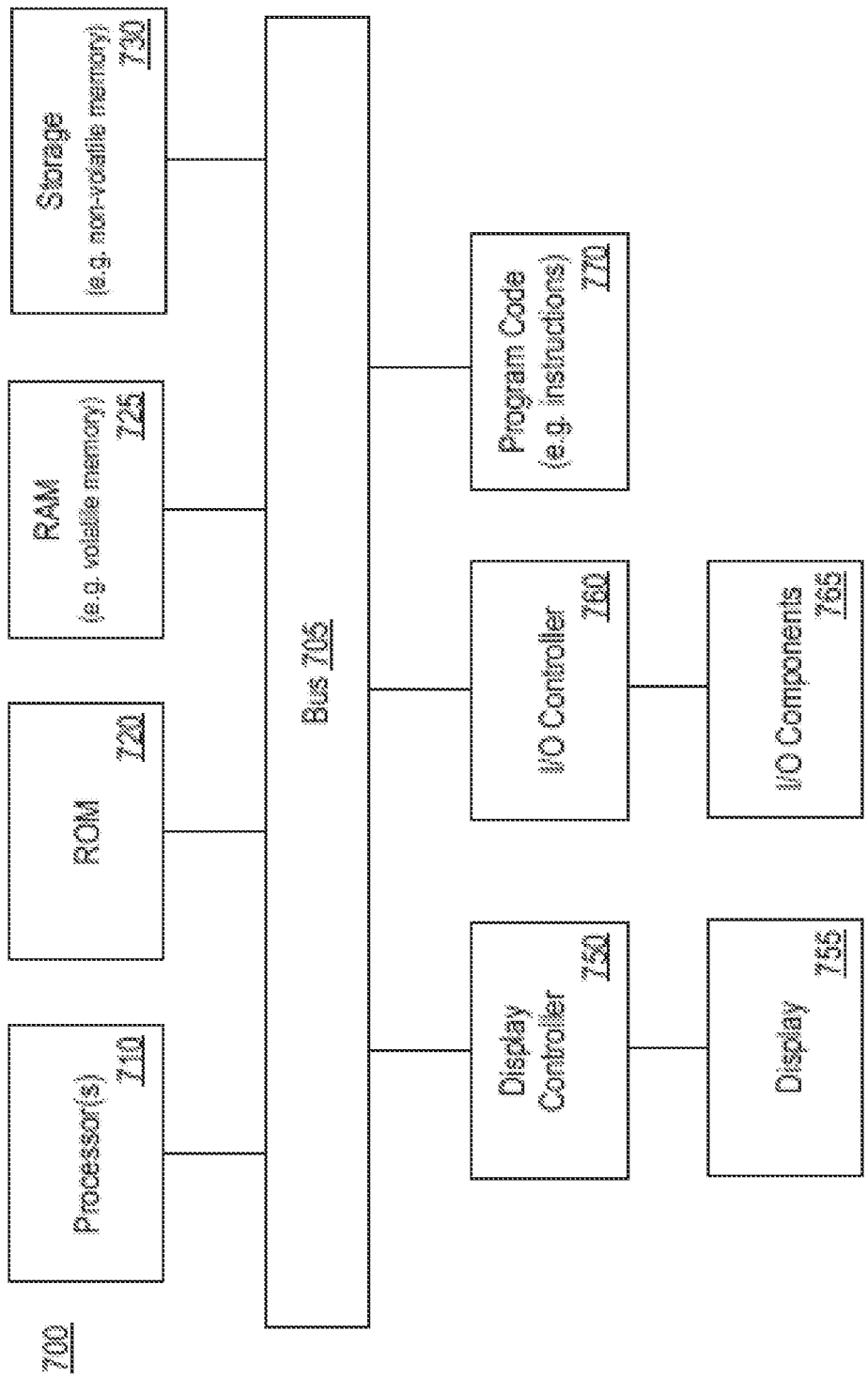
FIG. 6 is a block diagram of a system that may be used in conjunction with aspects of the invention.

FIG. 6 shows a block diagram of an example of a computing system that may be used in conjunction with one or more embodiments of the disclosure. For example, computing system 12 or 16 (or system, or server, or computing device, or device) may represent any of the devices or systems described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

Thus, according to the disclosure, embodiments are provided for retiring an obsolete compression algorithm, while ensuring that a client would not read a block that requires the use of a retired compression algorithm. According to one example, the client reports the compression algorithm used to compress each block sent to the storage system for storage. In one example, a compression algorithm ID may be appended to the ciphertext in the write command. The most common way of combining the two fields would be to place the compression algorithm before the ciphertext, which may be referred to as "prepending to the ciphertext". In this disclosure appending is meant to cover prepending and other methods, such as placing the compression algorithm after the ciphertext.

The compression algorithm ID may be stored in the deduplication table. Upon receiving a request to retire an obsolete compression algorithm (meaning any compression algorithm that a client wishes to retire), the storage system may sweep through the dedup table to find all blocks that having ID entry corresponding to the obsolete compression algorithm. For each of the discovered blocks, the system may then sweep the ClientBlockList table to discover all clients having entries corresponding to the fingerprints of the blocks having ID entry corresponding to the obsolete compression algorithm. The system may then send instructions to one of the clients with a handle to the block to refresh the block using an approved compression algorithm, different from the obsolete compression algorithm. After all of the blocks having ID entry corresponding to the obsolete compression algorithm have been refreshed, the system may approve retirement of the obsolete compression algorithm.

In another example, the compression algorithm is linked to the encryption key versions. In this example, the clients do not include the compression algorithm ID when sending the write command. The clients are then configured not to use the obsolete compression algorithm beyond a specified key version. Consequently, clients can refresh the blocks to new key versions and when the client can safely removes keys having key version older than the specified key version, the clients may also retire the obsolete compression algorithm.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. backup component 150). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of sending data of a client to a storage system, the method comprising:
    maintaining a list of compression algorithms approved for compression use;
    receiving over a network write commands to the storage system, each of the commands for a compressed and encrypted data block of a client and including at least a unique handle, a unique fingerprint, and a ciphertext of the compressed and encrypted data block;
    using the unique fingerprint to deduplicate the compressed and encrypted data block;
    upon receiving a request to deactivate an obsolete compression algorithm, performing:
        notifying all clients to cease using the obsolete compression algorithm for compression;
        refreshing all stored blocks compressed with the obsolete compression algorithm; and
        after all stored blocks compressed with the obsolete compression algorithm have been refreshed, removing the obsolete compression algorithm from the list of compression algorithms approved for compression use and notifying clients to retire the obsolete compression algorithm.

2. The method of claim 1, wherein the write command includes an algorithm ID of the compression algorithm.

3. The method of claim 2, further comprising maintaining a deduplication table and storing the algorithm ID in corresponding entry in the deduplication table.

4. The method of claim 3, wherein refreshing all stored blocks compressed with the obsolete compression algorithm comprises:
    sweeping through the deduplication table to discover all entries including algorithm ID corresponding to the obsolete compression algorithm;
    requesting corresponding clients to refresh stored blocks corresponding to discovered entries.

5. The method of claim 4, further comprising maintaining a client block list at the storage system, the client block list having client entries of all unique fingerprints belonging to each client, and wherein requesting corresponding clients to refresh stored blocks comprises sweeping the client block list to discover client entries corresponding to the discovered entries using the obsolete compression algorithm.

6. The method of claim 1, wherein the write command further comprises a key version corresponding to an encryption key, and wherein notifying all clients to cease using the obsolete compression algorithm for compression comprises indicating to cease using the obsolete compression algorithm beyond specified key version.

7. The method of claim 6, further comprising:
    retiring the obsolete compression algorithm when none of the stored data blocks includes the specified key version or a key version older than the specified key version.

8. A computing system for performing storage of data blocks of a client onto a storage system, the computing system comprising a processor and a memory storing executable instructions that, in response to execution by the processor, cause the computing system to perform the operations comprising:
    maintaining a list of compression algorithms approved for compression use;
    storing data blocks of the client onto the storage system; and,
    retiring obsolete compression algorithms;
    wherein storing data blocks comprises:
        for each block to be stored performing the operations:
            generate a unique handle for the block;
            generate a unique fingerprint for the block;
            select a compression algorithm from the list of compression algorithms approved for compression use;
            use the compression algorithm to compress the block;
            generate a ciphertext from the block;
            send over a network a write command to the storage system, the command including at least the unique handle, the unique fingerprint, and the ciphertext;
    and wherein retiring obsolete compression algorithm comprises:
        for each obsolete compression algorithm to be retired performing the operations:
            send from the storage system requests to clients to refresh blocks compressed using the obsolete compression algorithm;

after all stored blocks compressed with the obsolete compression algorithm have been refreshed, remove the obsolete compression algorithm from the list of compression algorithms approved for compression use and notify the clients to retire the obsolete compression algorithm.

9. The computing system of claim 8, further causing the computing system to perform for each block:
including in the write command an encryption key version;
flagging the obsolete compression algorithm to be forbidden for use at a specified key version or a key version newer than the specified key version.

10. The computing system of claim 8, further causing the computing system to perform for each block:
including in the write command an ID of the compression algorithm;
maintaining at the storage system a deduplication table, the deduplication table including a list of all unique fingerprints, and storing the ID in the deduplication table for each corresponding fingerprint.

11. The computing system of claim 8, further causing the computing system to perform for each block:
appending to the ciphertext an ID of the compression algorithm.

12. The computing system of claim 8, further causing the computing system to perform for each block:
including in the write command an ID of the compression algorithm;
upon receiving the write command at the storage system, rejecting the write command when the ID corresponds to a compression algorithm marked for retirement.

13. The computing system of claim 12, further causing the computing system to perform for each block:
when the ID corresponds to a compression algorithm not marked for retirement, performing deduplication using the fingerprint included in the write command.

14. The computing system of claim 13, further causing the computing system to perform for each block:
when deduplication process indicates a stored block has an identical fingerprint, replacing the stored block when compression algorithm ID of the stored block corresponds to a compression algorithm marked for retirement.

15. A computer-readable storage medium for performing storage for data blocks of a client onto a storage system, the computer-readable storage medium being non-transitory and having computer-readable program code stored therein that in response to execution by a processor, causes an apparatus to at least:
maintain at the client a list of configured compression algorithm and including a flag for each compression algorithm approved for use;
maintaining at the storage system a list of client blocks, each entry in the list of client blocks corresponding to one data block stored for the client and includes a fingerprint;
maintaining a deduplication table including entries for a compression algorithm ID, and an encryption key version;
upon receiving a request to retire an obsolete compression algorithm, refreshing all data blocks having a compression algorithm ID corresponding to the obsolete compression algorithm and,
when all of the data blocks having a compression algorithm ID corresponding to the obsolete compression algorithm have been refreshed, removing the obsolete compression algorithm from the list of compression algorithms approved for compression use and notifying the clients to retire the obsolete compression algorithm.

16. The computer-readable storage medium of claim 15, further causing the apparatus to at least performing by the client for each block:
generate a unique handle for the block;
generate a unique fingerprint for the block;
select a compression algorithm from the compression algorithms flagged as approved for use;
use the compression algorithm to compress the block;
generate ciphertext from the block; and
send over a network a write command to the storage system, the command including at least the unique handle, the unique fingerprint, and the ciphertext;
receive at the storage system the write command; and,
use the unique fingerprint to perform deduplication process on the block.

17. The computer-readable storage medium of claim 16, further causing the apparatus to at least perform:
Sending to each client an instruction not to use the obsolete compression algorithm beyond a specified encryption key version.

18. The computer-readable storage medium of claim 16, further causing the apparatus to at least perform:
including in the write command an ID of the compression algorithm.

19. The computer-readable storage medium of claim 16, further causing the apparatus to at least perform:
appending to the ciphertext an ID of the compression algorithm.

20. The computer-readable storage medium of claim 18, further causing the apparatus to at least perform:
upon receiving the write command at the storage system, rejecting the write command when the ID corresponds to a compression algorithm marked for retirement.

* * * * *